United States Patent [19]

Hammer

[11] Patent Number: 5,598,492
[45] Date of Patent: Jan. 28, 1997

[54] METAL-FERROMAGNETIC OPTICAL WAVEGUIDE ISOLATOR

[76] Inventor: Jacob M. Hammer, 42 City Gate La., Annapolis, Md. 21401

[21] Appl. No.: 541,915

[22] Filed: Oct. 10, 1995

[51] Int. Cl.⁶ .................................................. G02B 6/27
[52] U.S. Cl. ................... 385/27; 385/31; 385/37; 385/132; 372/40; 372/43; 372/703; 257/63
[58] Field of Search .................................. 385/27, 28, 31, 385/37, 39, 130, 131, 132; 372/45, 40, 43, 44, 50, 703, 27, 37; 257/63, 64, 65

[56] References Cited

U.S. PATENT DOCUMENTS

| | | | |
|---|---|---|---|
| 4,746,181 | 5/1988 | Hayakawa et al. | 385/131 X |
| 5,388,117 | 2/1995 | Nishimura | 372/27 X |
| 5,408,565 | 4/1995 | Levy et al. | 385/131 |

*Primary Examiner*—Phan T. H. Palmer
*Attorney, Agent, or Firm*—Donald S. Cohen

[57] ABSTRACT

An optical device includes a body of a semiconductor material having a waveguide therein along which light flows and means for providing gain to the light. A layer of an amorphous or polycrystalline metallic-ferromagnetic material extends along the waveguide and means, such as a permanent magnet, provides a magnetic field to the metallic-ferromagnetic material layer. This provides an optical isolator of the Faraday rotation type which can be integrated with a variety of material systems including those commonly used to fabricate semiconductor lasers, arrays and amplifiers.

8 Claims, 3 Drawing Sheets

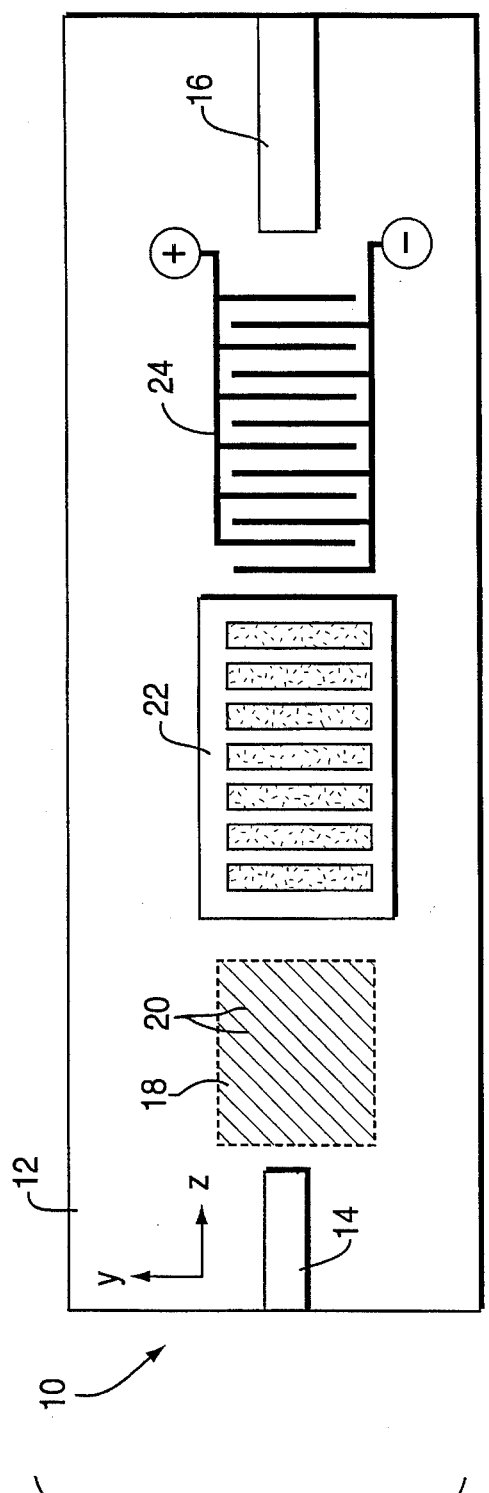
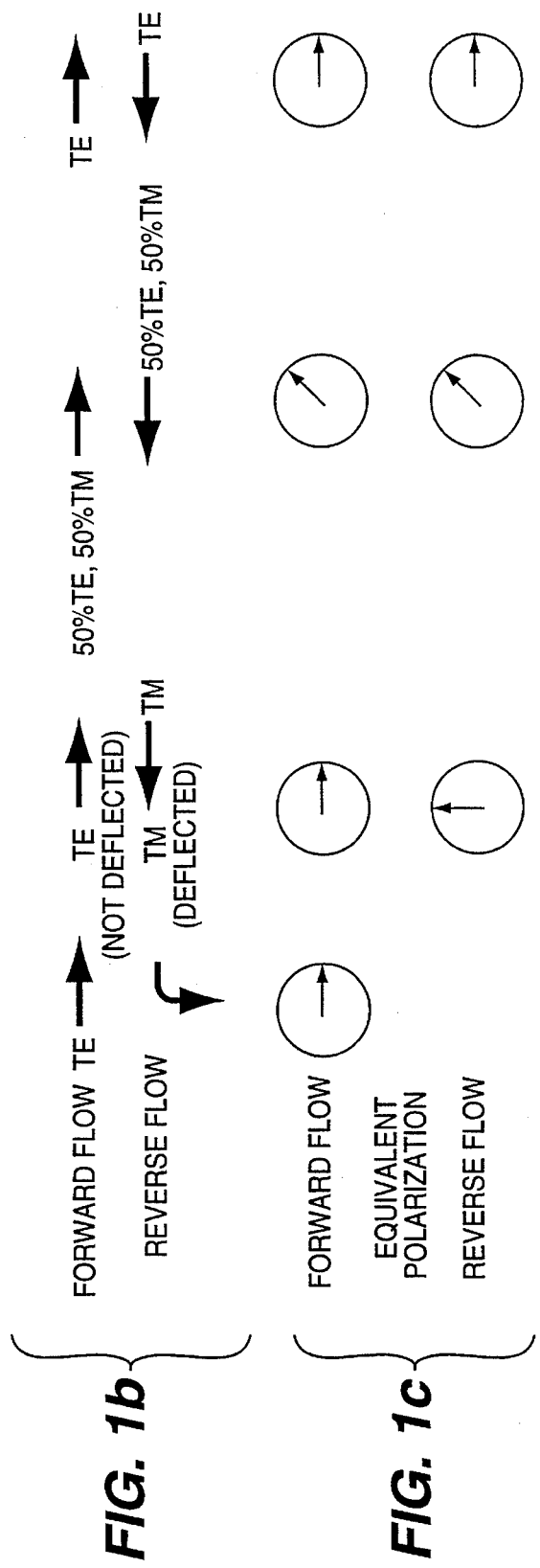
FIG. 1a
FIG. 1b
FIG. 1c

METAL-FERROMAGNETIC OPTICAL WAVEGUIDE ISOLATOR

This invention was made with Government support under Contract No. DASG60-C-0070 awarded by the U.S. Department of the Army. The Government has certain rights in this invention.

FIELD OF THE INVENTION

The present invention is directed to a metallic-ferromagnetic waveguide isolator, and, more particularly, to such an isolator which is integrated with a device containing a waveguide and/or diode laser or diode laser amplifier.

BACKGROUND OF THE INVENTION

A number of semiconductor lasers, laser array, optical amplifiers, and optical amplifier arrays have been recently developed for high power application. These, in addition to diode lasers used in communications, benefit greatly if used in conjunction with isolators capable of preventing reflections from reentering the laser or amplifier. In addition, a number of integrated optic devices, such as switches and modulators, which are useful in optical communications would benefit if there were available isolators that could be integrated directly on the same substrate as the device.

Briefly, isolators protect the lasers from instabilities resulting from external reflection. They can be used to avoid the problem of multi-mode operation in linear GSE arrays by allowing only unidirectional flow of light to lock up the array members. Further, the use of an isolator can help stabilize the operation of semiconductor master-oscillator power amplifier devices. In addition to these, there are many other areas in optical communications, fiber optic telephony and integrated optics which are improved by the use of optical isolators to separate various system components.

To date there have been no isolators that can be monolithically integrated with semiconductor sources and/or amplifiers or with many electro-optic or passive waveguide devices. Waveguide optic isolators, to date, have been based on Faraday rotation types in crystalline magnetic garnet waveguides that generally cannot be grown or deposited on other material systems. Therefore, it would be desirable to have an isolator material which can be deposited on other material systems, particularly the semiconductor materials used to form semiconductor lasers and other optical devices, to be able to form an isolator integrated with the optical devices containing a waveguide.

SUMMARY OF THE INVENTION

The present invention is directed to an optical device comprising a body of a semiconductor material having a waveguide therein, and a layer of a metallic-ferromagnetic material on the body. The layer of the metallic-ferromagnetic material forms a part of an isolator which protects the device from instabilities resulting from external reflections.

BRIEF DESCRIPTION OF THE DRAWINGS

FIG. 1a is a schematic view of one form of a metallic-ferromagnetic optical waveguide isolator in accordance with the present invention;

FIG. 1b shows the TE-to-TM mode conversion properties of the device shown in FIG. 1a;

FIG. 1c shows the polarization rotation that is the bulk equivalent to the mode conversion in the isolator shown in FIG. 1a;

DETAILED DESCRIPTION

Figure 2:
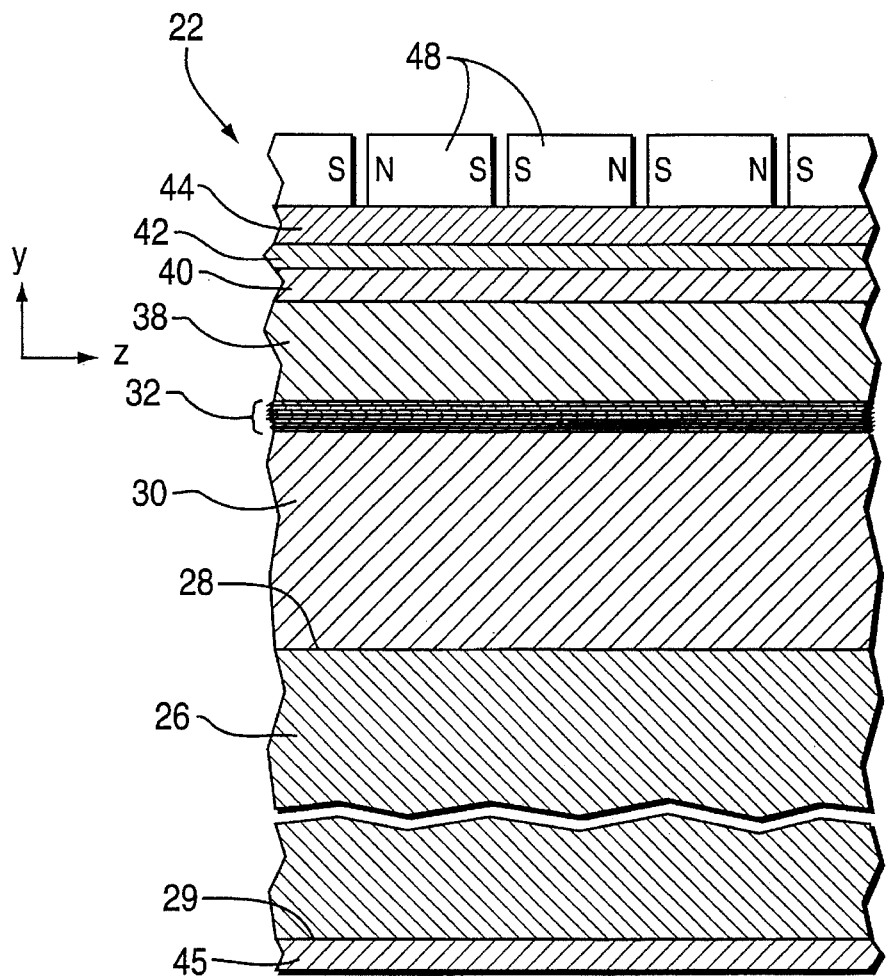
FIG. 2 is a sectional view of the non-reciprocal TE-TM mode converter shown in the isolator of FIG. 1.

Referring initially to FIG. 1a, there is schematically shown an optical isolator 10 formed on a body 12 of a semiconductor material having a waveguide, not shown, therein. The optical isolator 10 comprises a TE mode input 14 at one end of the body 12 and a TE mode output 16 at the other end of the body 12. The TE mode input 14 may be a stripe or a planar guide. Adjacent the TE mode input 14 is a Bragg deflection grating analyzer 18 formed of a Bragg deflection grating with lines 20 at 45° to the z-axis, the axis along which the light is flowing through the isolator 10. The grating has a period to deflect a TM mode through 90° in the waveguide plane. Adjacent the Bragg deflection grating analyzer 18 is a Faraday rotator TE-TM mode converter 22. Between the Faraday rotator TE-TM mode converter 22 and the output 16 is a TE-TM mode converter 24. The mode converter 24 is shown to be an interdigital electro-optical converter, but can be any other well known type of reciprocal TE-TM mode converter.

For the purpose of the discussion of the operation of the isolator 10, it will be assumed that the waveguide is chosen so that only the lowest order (fundamental) TE and TM modes need be considered. However, the same principle can be used to construct isolators on multi-mode optical waveguides. ATE mode light wave entering through the TE mode input 14 in the +z direction, passes undeflected through the Bragg deflection grating analyzer. The TE mode is undeflected both because the grating is out of resonance for the TE mode as a result of the modal dispersion, and the 45° angle is the Brewster's angle for the TE modes.

The TE mode then enters the Faraday rotator TE-TM mode converter 22 which has a rotator length $L_m$ chosen so that the light emerges as a mixed mode with the TE/TM ratio equal to 50%. This corresponds to a polarization rotation of 45°. The Faraday rotation is non-reciprocal. A periodicity in the ferromagnetic material with period $A_m$ may be used to compensate for dispersion between the TE and Tm modes. The light then passes through the reciprocal TE-TM mode converter 24. The length of the converter 24 is chosen so that a pure TE mode emerges to complete the isolator 10. The periodicity of the converter 24 is chosen to compensate for the dispersion which may not be the same as in the waveguides of the Faraday rotator section 22.

Reflected light flows in the −z direction from the output 16, which may be a stripe or a planar guide, and passes back through the electro-optic converter 24. The converter 24 restores the 50% TE/TM ratio (corresponding to 45° polarization). The reflected light then flows through the Faraday rotator 22 which converts the light to a pure TM mode (which corresponds to vertical polarization in the bulk case). The TM mode light is then deflected at right angles by the Bragg deflection grating 18. The TM light may be removed by an absorbing waveguide section or converted for other uses by appropriate strip guides. As an alternative to the deflecting grating, metallic absorbers which preferentially absorb TM light may be used. The TE to TM mode conversion properties and the equivalent polarization rotation that is obtained and described above, are shown in FIGS. 1b and 1c respectively.

Figure 3:
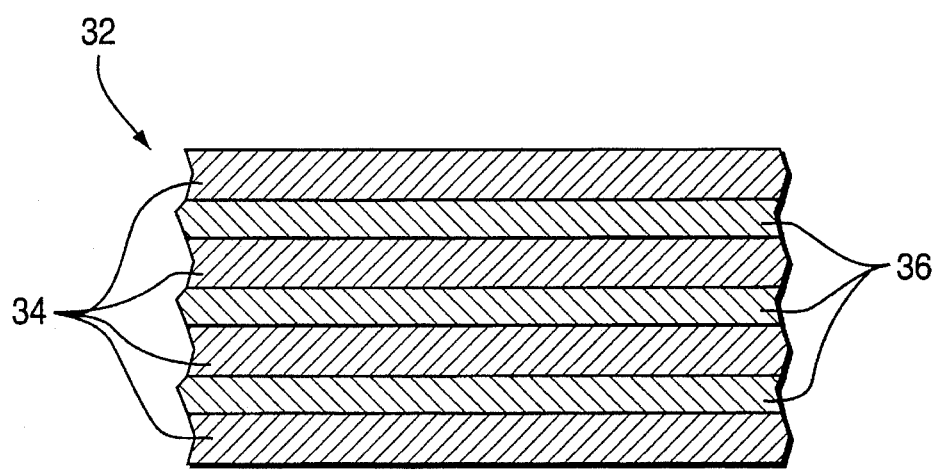
FIG. 3 is an enlarged sectional view of a portion of the converter shown in FIG. 2.

Referring to FIG. 2, there is shown in more detail one form of the non-reciprocal converter 22 which includes the present invention. Converter 22 comprises a substrate 26 of an n-type conductivity semiconductor material, such as InP, having first and second opposed surfaces 28 and 29. On the first surface 28 of the substrate 26 is a first cladding layer 30 of an n-type conductivity semiconductor material, preferably the same material as the substrate 26 (such as InP). The first cladding layer 30 may be of a thickness of about 2 microns. On the first cladding layer 30 is a strained layer multi-quantum well region 32. As shown in FIG. 3, the quantum well region 32 is formed of alternate barrier layers 34 and quantum well layers 36. Each of the barrier layers 34 may be 270 angstroms in thickness and of InGaAsP with a band gap energy of 0.95 eV under 0.15% compressive strain. Each of the quantum well layers 36 may be of a thickness of 160 angstroms and of $In_{0.39}Ga_{0.61}$ As under a 1% strain.

On the quantum well region 32 is a second cladding layer 38 of a p-type conductivity semiconductor material, such as InP. The second cladding layer 38 is about 3,000 angstroms in thickness. A cap layer 40 is on the second cladding layer 38. The cap layer 40 is of a p-type conductivity semiconductor material which is latticed matched to the semiconductor material of the second cladding layer 38, such as InGaAsP, and is of a thickness of about 500 angstroms. On the cap layer 40 is a layer 42 of a polycrystalline or amorphous metallic-ferromagnetic material. The metallic-ferromagnetic material layer 42 is of a thickness of about 1,000 angstroms. On the metallic-ferromagnetic material layer 42 is a first metal contact layer 44 of a metal which makes good ohmic contact with the metallic ferromagnetic material layer 42, such as gold. A second metal contact layer 45 is on the second surface 29 of the substrate 24. The metal contact layers are each of a thickness of about 2,000 angstroms. Over the first metal contact layer 44 are a plurality of permanent magnets 48.

In the device shown, the metallic-ferromagnetic material layer 42 is the Faraday rotator with the z directed magnetic field being provided by the permanent magnets 48. The metal ferromagnetic material also serves as part of an electrical contact allowing forward current to be applied, and thus, providing gain to compensate for loses in the metal ferromagnetic layer. Based on standard waveguide-laser theory and a numerical calculation of the actual mode conversion, the following parameters and results were found. The device had a lateral width of 2.5 microns and for an operating wavelength of 1.54 microns, the required overall length (in the z direction) is 1,417 mm and the operating current is 86.4 mA. To obtain exact TE-TM phase match, the magnetic field reversal period is 0.066 mm. With the above dimensions and current, half of the TE mode input intensity is converted to TM mode intensity at the end of the section. In the reverse direction, a reflected wave which is 50% TM will emerge at the input as a wave with a TM intensity which has undergone 5 dB of amplification and a TE intensity which is reduced sufficiently to give an isolation ratio of −69 dB.

It should be understood that the preferred embodiment of this invention includes a gain mechanism to compensate for the loss in the ferromagnetic layer. In the particular structures shown in FIGS. 2, 3, 4 and 5, gain is provided by injection current in a quantum well type of junction layer. Other junction laser type structures which give gain by injection current which are well known in the art may also be used. The current is injected by applying forward voltage between the contacts.

In addition, other gain mechanisms, such as the gain obtained by optical pumping of solid state lasers, may also be employed to form metal ferromagnetic isolators. For example, waveguides of Nd doped $LiNbo_3$ or NdYAG types of insulating waveguide materials may be used to make isolators with gain based on the metal ferromagnetic approach of this invention.

Figure 4:
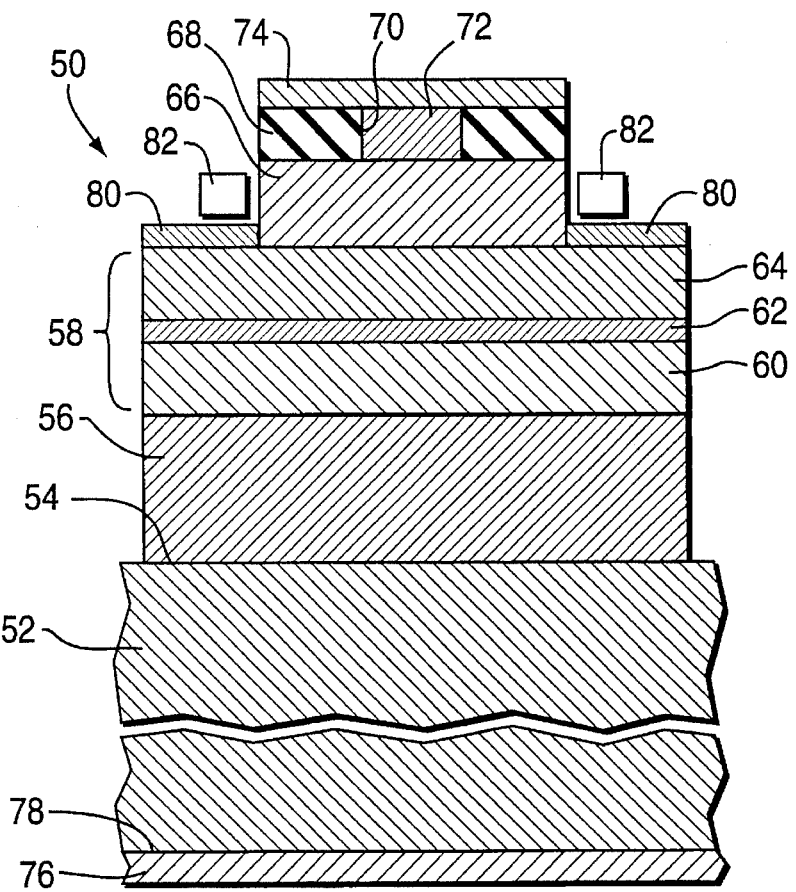
FIG. 4 is a sectional view of another form of the non-reciprocal mode converter.

Referring now to FIG. 4, another form of the mode converter of the present invention is generally designated as 50. Converter 50 comprises a substrate 52 of a semiconductor material of n-type conductivity having a surface 54. On the surface 54 of the substrate 52 is a first cladding layer 56 of an n-type conductivity semiconductor material. On the first cladding layer 56 is a waveguide 58. Waveguide 58 comprises a first large optical cavity (LOC) layer 60 of n-type conductivity, a quantum well layer 62 on the first LOC layer 60 and a second LOC layer 64 of p-type conductivity on the quantum well layer 62. The LOC layers 60 and 64 and the quantum well layer 62 are of a semiconductor material with the LOC layers 60 and 64 being of a semiconductor material which will confine electrons to the quantum well layer 62 but allow light to enter and flow along the LOC layers 60 and 64. A second cladding layer 66 of a p-type conductivity semiconductor material is on a portion of the second LOC layer 64. The first and second cladding layers 56 and 66 are of a semiconductor material which will prevent light from flowing out of the waveguide 58 into the cladding layers.

A layer 68 of an insulating material, such as silicon oxide, is on the second cladding layer 66, and has an opening 70 therethrough. A cap layer 72 of a highly conductive p-type conductivity material is on the second cladding layer 66 within the opening 70 in the insulating layer 68. A first metal contact layer 74 is on the cap layer 72. A second metal contact layer 76 is on the surface 78 of the substrate 52 opposite the surface 52. A layer 80 of a polycrystalline or amorphous metallic-ferromagnetic material is on the portions of the second LOC layer 64 not covered by the second cladding layer 66. Permanent magnets 82 are provided along the metallic-ferromagnetic material layer 80.

In the device 50, the metallic-ferromagnetic material layer 80, like in the device 22 shown in FIG. 2, serves as a Faraday converter. However, in the device 50, the metallic-ferromagnetic material layer 80 is directly on a surface of the waveguide 58. In this structure also, current injected by applying forward voltage between the contacts provides gain.

Figure 5:
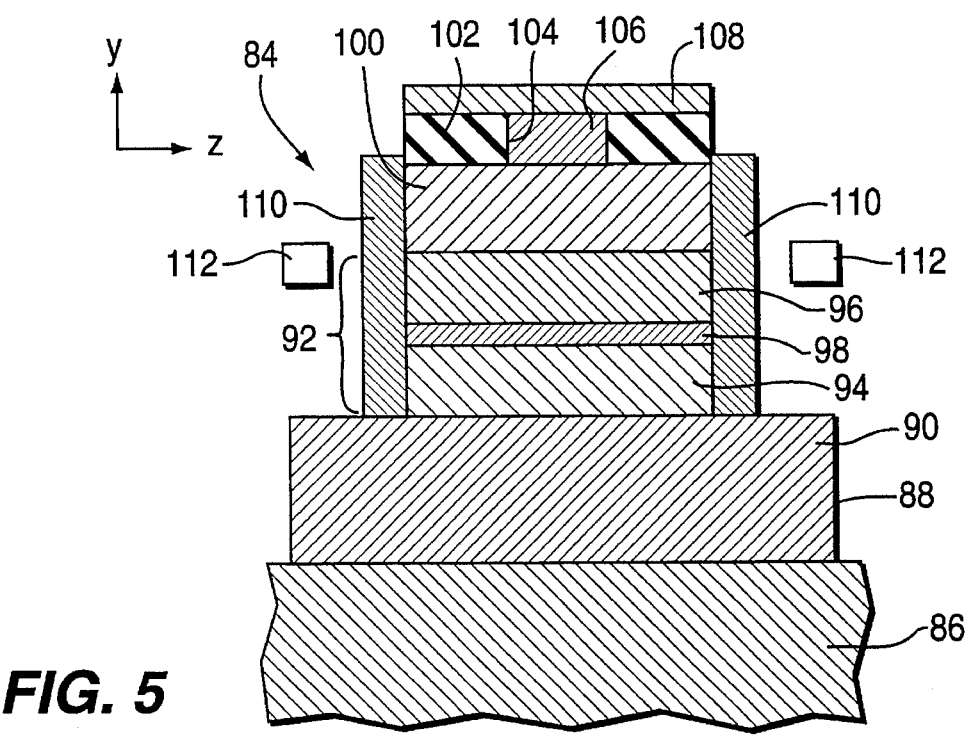
FIG. 5 is a sectional view of still another form of the non-reciprocal mode converter.

Referring now to FIG. 5, still another form of the converter of the present invention is generally designated as 84. Converter 84 comprises a substrate 86 of a semiconductor material of n-type conductivity having a surface 88. On the surface 88 of the substrate 86 is a first cladding layer 90 of a semiconductor material of n-type conductivity. On a portion of the surface of the first cladding layer 90 and extending longitudinally along the z-axis is a strip of a waveguide 92. Waveguide 92 comprises first and second LOC layers 94 and 96 of a semiconductor material of n-type conductivity and p-type conductivity respectively with a quantum well layer 98 of a semiconductor material therebetween. A second cladding layer 100 of p-type conductivity is on the second LOC layer 96 of the waveguide 92. On the second cladding layer 100 is a layer 102 of an insulating material, such as silicon oxide, having an opening 104 therethrough. A cap layer 106 of a semiconductor material of p-type conductivity is on the second cladding layer 100 within the opening 104 in the insulating layer 102. A metal contact layer 108 is on the cap layer 106 and makes good ohmic contact therewith. Although not shown, a second metal contact layer is on a surface of the substrate 84 opposite the surface 86. A separate layer 110 of a metallic-ferromagnetic material is on each side of the waveguide 92 and a plurality of permanent magnets 112 are along each metallic-ferromagnetic material layer 110.

The converter 84 operates in the same manner as described above with regard to the converter 22 and 50 shown in FIGS. 2 and 4 respectively. However, in the converter 84, the metallic-ferromagnetic material layers extend along the sides of the waveguide rather than over the waveguide. Here again current injected by applying forward voltage between the contacts provides gain.

Thus, there is provided by the present invention a optical waveguide isolator which includes a layer of a metallic-ferromagnetic material deposited on and along a waveguide formed of semiconductor material. Since the metallic-ferromagnetic layer is either amorphous or polycrystalline, it may be deposited on the device by any well known depositing technique, such as evaporation, sputtering, vapor phase deposition, metal-organic-chemical-vapor deposition or liquid phase deposition. This allows the isolator to be easily integrated in an optical device formed of a semiconductor material so that the optical device can be made small and compact and is relatively easy to manufacture. Although the devices shown and described have waveguides which are formed of quantum well layers, the invention can be used with other types of waveguide structures. Also, although permanent magnets have been shown for providing a magnetic field in the metallic-ferromagnetic layers, other sources, such as a solenoid, can be used to provide the field.

What is claimed is:

1. An optical waveguide isolator comprising:

a body of a semiconductor material having a surface and first and second ends;

a waveguide in the body extending along said surface between said ends;

an input guide at the first end and an output guide at the second end;

a Bragg deflection grating analyzer adjacent the input guide;

a Faraday rotator waveguide TE-TM mode converter adjacent the analyzer; and a TE-TM mode converter between the Faraday rotator and the output guide;

said Faraday rotator including a layer of an amorphous or polycrystalline metallic-ferromagnetic material extending along the waveguide.

2. The isolator of claim 1 in which the waveguide includes means for providing gain for light passing therethrough.

3. The isolator of claim 2 in which the body comprises a substrate of a semiconductor material of one conductivity type having a surface and the rotator includes a first cladding layer of a semiconductor material of the one conductivity type on the surface of the substrate, a waveguide on the first cladding layer, a second cladding layer of a semiconductor material of a second conductivity type opposite the one conductivity type, and the metallic-ferromagnetic material layer is along the waveguide.

4. The isolator of claim 3 in which the metallic-ferromagnetic material layer is over and along the second cladding layer.

5. The isolator of claim 3 in which the second cladding layer is only over a portion of the width of the waveguide and the metallic-ferromagnetic material layer directly on the waveguide.

6. The isolator of claim 3 in which the waveguide is narrower than the width of the first cladding layer and the metallic-ferromagnetic material layer is on the sides of the waveguide.

7. The isolator of claim 2 including means for applying a magnetic field to the metallic-ferromagnetic material layer.

8. The isolator of claim 7 in which the means for applying a magnetic field comprises permanent magnets extending along the metallic-ferromagnetic material layer.

\* \* \* \* \*